Figure 1:
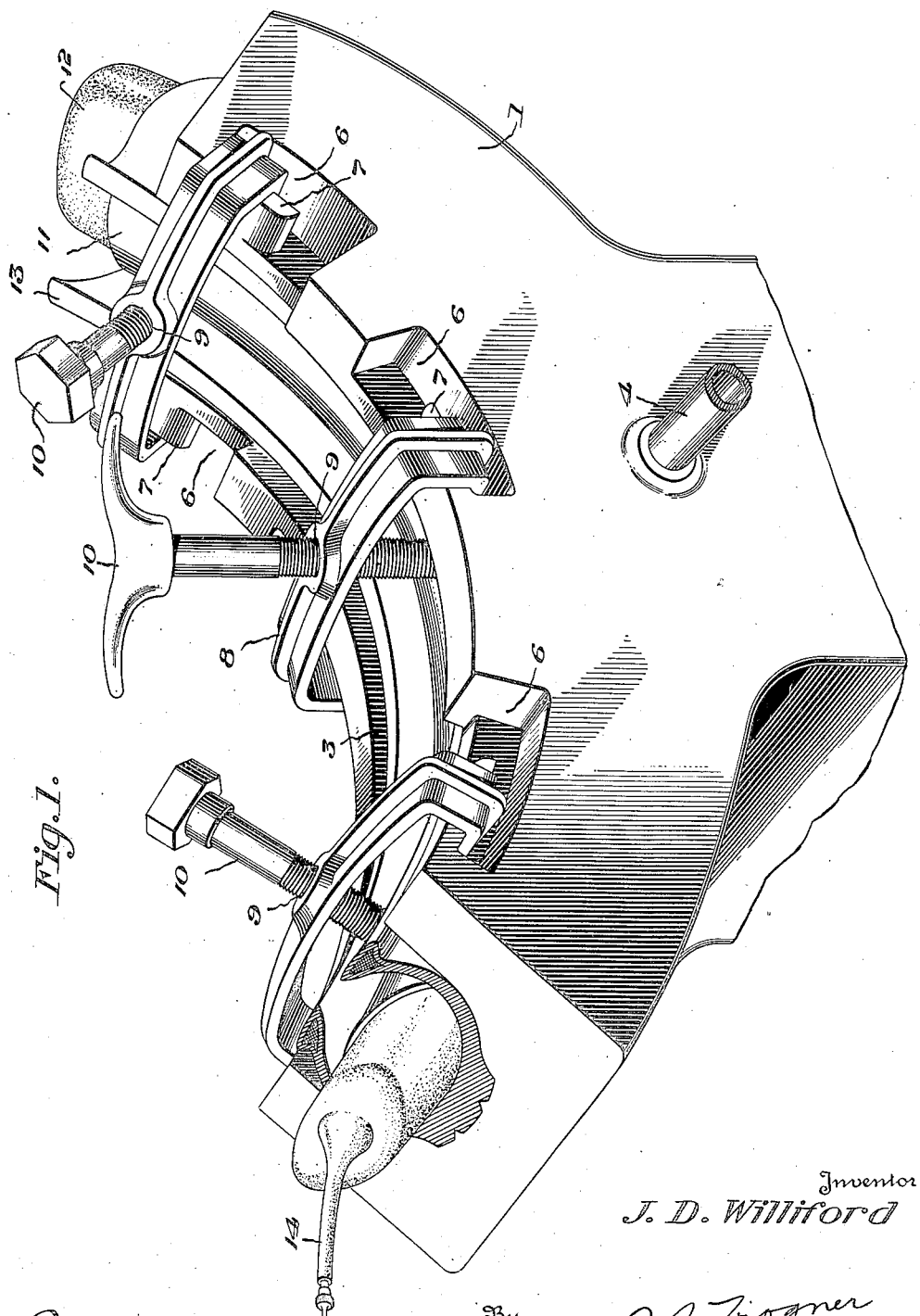

Feb. 13, 1923.

J. D. WILLIFORD

TIRE RETREADING DEVICE

Filed Aug. 25, 1920

1,445,428

2 sheets-sheet 1

Inventor
J. D. Williford

By R. D. Trogner
Attorney

Philip E. Barnes

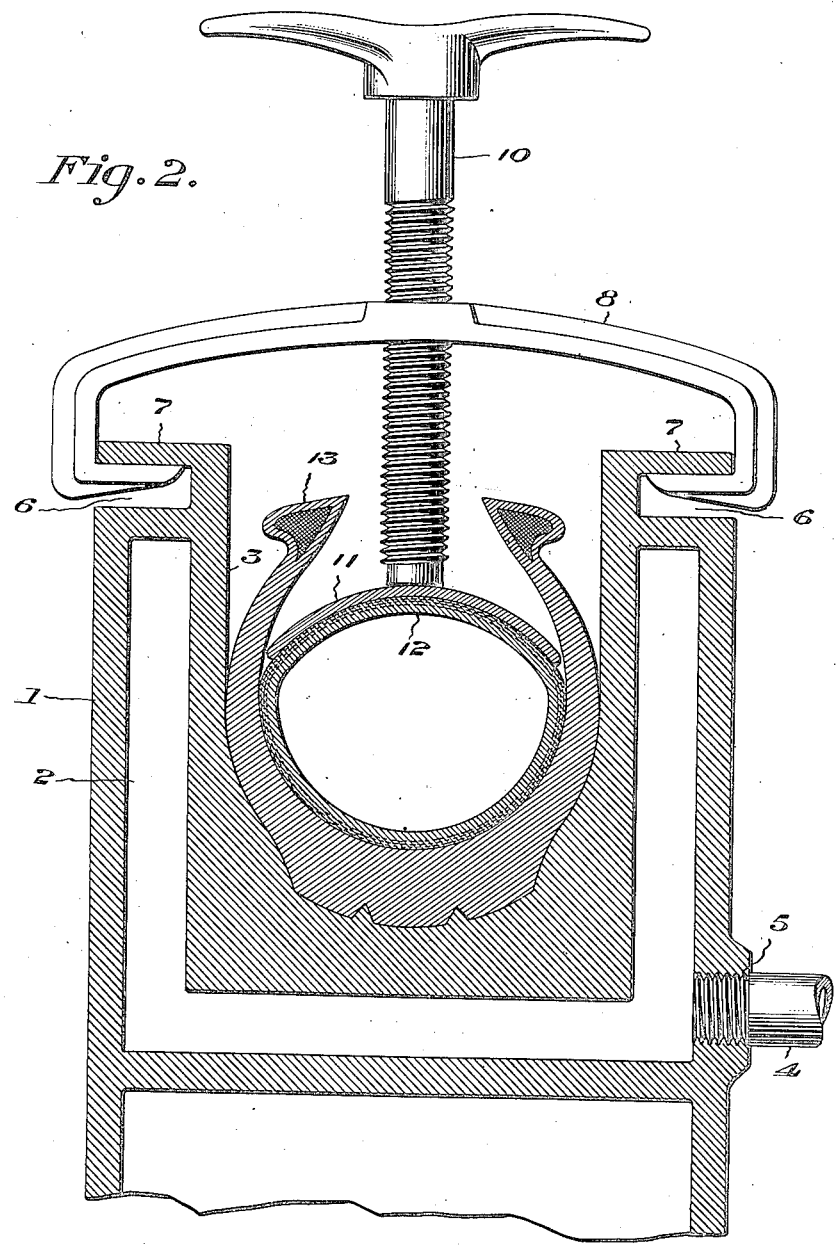

Patented Feb. 13, 1923.

1,445,428

UNITED STATES PATENT OFFICE.

JAMES D. WILLIFORD, OF AKRON, OHIO, ASSIGNOR TO THE GOODYEAR TIRE & RUBBER COMPANY, OF AKRON, OHIO, A CORPORATION OF OHIO.

TIRE-RETREADING DEVICE.

Application filed August 25, 1920. Serial No. 405,839.

*To all whom it may concern:*

Be it known that I, JAMES D. WILLIFORD, a citizen of the United States, residing at Akron, in the county of Summit and State of Ohio, have invented new and useful Improvements in Tire-Retreading Devices, of which the following is a specification.

My invention relates to devices for retreading tire casings, and it has for its primary object the construction of a device of the above described character which shall be relatively inexpensive and which shall insure uniform transmission of the necessary pressure required in the vulcanizing apparatus which is utilized.

Heretofore it has been customary in retreading tire casings to employ a vulcanizing apparatus and a core or pressure transmitting device consisting of a fabric casing filled with material, such as sand. However, such a pressure transmitting device is unsatisfactory and open to criticism on account of the fact that the pressure, which is exerted by means of clamp screws, is not transmitted uniformly in all directions.

One object of my invention, therefore, resides in the provision of an expansible air bag which may be inflated after being disposed between a tire casing and a suitable clamping device to secure the necessary pressure upon the tire casing during the vulcanizing process.

Another object of my invention is to construct a device for retreading tires which shall obviate the necessity of utilizing bead molds, which are relatively expensive and not essential to the process of retreading a tire casing.

A still further object of my invention is to construct a device for retreading tire casings in which an expansible tube may be employed for applying pressure to the tire casing, of such shape as to insure the application of pressure at the desired portions in the tire casing, and which, furthermore, by reason of its shape, shall be less expensive than tubes of a like character employed heretofore.

With these and many other important objects in view my invention will be more fully described, illustrated in the drawings, in which like numerals indicate like parts, and then more fully pointed out in the claim.

In the drawings, Figure 1 is a perspective view of a tire retreading device constructed in accordance with my invention.

Figure 2 is a transverse sectional view of the device shown in Figure 1.

In practicing my invention a tire retreading device may be constructed by employing a mold provided with a suitable heating chamber, such as a steam chamber, and of such shape as to be adapted to receive a tire casing which is to be retreaded. The mold is preferably formed with a plurality of recesses and flanges adjacent its top into which clamping members may be disposed, which are adapted to receive suitable clamping screws. An expansible tube of a desired contour may be disposed in a tire casing placed in the mold, and an arcuate clamping plate may be disposed on top of the expansible tube. The clamping screws are adapted to engage the arcuate plate and when in such position the expansible tube is inflated to exert the desired pressure upon the tire casing, to which heat is applied by means of steam admitted to the steam chamber of the mold.

In order to insure a clear understanding of my invention a device constructed in accordance therewith is shown in Figures 1 and 2, comprising a mold 1 which is provided with a steam chamber 2, and with a properly shaped vulcanizing chamber 3. Steam is admitted to the chamber 2 by means of a conduit 4 threaded into a suitable opening 5 drilled into the wall of the mold. A plurality of recesses 6 are formed adjacent the top of the mold and are provided with shoulders 7 under which the curved ends of clamping members 8 may be disposed. The clamping members 8 are provided with bolt-receiving openings 9 at their central portions, and bolts 10 are threaded into these openings to engage an arcuate clamping plate 11. The clamping plate 11 is adapted to be disposed upon an expansible tube 12, of such contour as clearly shown in the drawings. The tube 12 may be made of any suitable material, such as frictioned or impregnated fabric, and it is slightly curved along its axis to adapt it to be fitted within a tire casing 13, which it is desired to retread. The expansible tube is formed with one closed end, and is provided at its opposite end, with a valve-stem 14 through which air may be forced to inflate the tube.

It should be noted that the expansible tube 12 is of peculiar shape in cross section to adapt it to fit within the tire casing 13 in such manner as to engage substantially the intermediate portions of the side walls of the casing and along the inner periphery of the tread. This shape is given to the expansible tube 12 in order that the ends of the tire casing or bead portions may be free of the mold walls, thus obviating any danger of this portion of the tire becoming overcured. Furthermore, by employing a tube of the shape shown in the drawings, the expense of its construction may be somewhat reduced because less material is required than in a tube conforming to the contour of the complete interior periphery of the tire casing.

In utilizing the tire retreading device above described, a tire casing 13, a section of which is shown in the drawings, is disposed in the mold chamber 3 after being provided with the new tread which it is desired to vulcanize. The clamping members 8 are then disposed in the recesses 6 and the bolts 10 are screwed down to engage the arcuate plate 11 which is placed upon the tube 12 disposed in the casing 13. The tube 12 is preferably deflated, or at least under inflated, before the clamping screws 10 are advanced to engage the arcuate plate 11 and to secure the tube in position. The expansible tube is then inflated by forcing air through the valve 14, whereby pressure is exerted upon the inner periphery of the tire casing 13 to force it against the walls of the mold which are then heated by the admission of steam to the chamber 2. The tire casing is permitted to remain in the above described position until the tread has been thoroughly cured on the portion of the casing enclosed by the mold chamber, after which the casing is turned to include the uncured portions thereof and the operation repeated.

It will of course be appreciated that the above device is primarily intended to be constructed in the form of a one-third circle mold which is best adapted for retreading tire casings. I am aware that inflated tubes have been employed in repairing tires heretofore, but to the best of my knowledge no one has conceived of employing an inflated tube of the particular shape above described in a one-third circle mold. It is possible of course to obtain a uniform distribution of pressure by other means than air inflated tubes, but a very careful selection of sand or filling material must be made, and pressure must be applied to the clamping screws by workmen experienced in such work. By means of the device above described a tire may be properly retreaded by workmen moderately skilled in tire repairing with little difficulty and with a minimum outlay of expense in providing the proper equipment.

Although I have shown and described a tire retreading device which embodies my invention, it is obvious that minor changes may be made in the construction thereof without departing from the spirit or scope of my invention, and I desire, therefore, that no limitations shall be imposed except such as are indicated in the appended claim.

What I claim is:

A device for retreading tires comprising a one-third circle mold provided with a steam chamber, an air bag of such contour as to engage a tire casing disposed in the mold from substantially the midpoint of one side wall to an opposite point of its other side wall, means for clamping the bag in the mold, said means including an arcuate plate, a plurality of bolts, and a plurality of supporting members adapted to receive the bolts and to engage the walls of the mold.

In witness whereof, I have hereunto signed my name in the presence of two subscribing witnesses.

JAMES D. WILLIFORD.

Witnesses:
L. M. HARTMAN,
A. J. KNIGHT.